United States Patent [19]

Popovich et al.

[11] Patent Number: 4,858,254
[45] Date of Patent: Aug. 22, 1989

[54] TUB APPARATUS

[75] Inventors: John M. Popovich, Los Angeles; Roc V. Fleishman, Venice, both of Calif.

[73] Assignee: Softub, Inc., Pacoima, Calif.

[21] Appl. No.: 145,233

[22] Filed: Jan. 19, 1988

Related U.S. Application Data

[63] Continuation-in-part of Ser. No. 891,232, Jul. 30, 1986.

[51] Int. Cl.⁴ ............................................. A61H 33/02
[52] U.S. Cl. ........................................... 4/542; 4/544; 4/584
[58] Field of Search ..................... 4/538, 584, 542–544

[56] References Cited

U.S. PATENT DOCUMENTS

| 2,734,459 | 2/1956 | Zimsky | 417/367 X |
| 3,943,580 | 3/1976 | Carter | 4/542 X |
| 4,699,288 | 10/1987 | Mohan | 220/3 |

FOREIGN PATENT DOCUMENTS

| 0064002 | 3/1969 | Australia | 428/316.6 |
| 0057273 | 5/1978 | Japan | 4/584 |
| 0033503 | 8/1985 | Japan | 4/584 |
| 0033504 | 8/1985 | Japan | 4/584 |
| 0904763 | 8/1962 | United Kingdom | 428/316.6 |

Primary Examiner—Charles E. Phillips
Attorney, Agent, or Firm—William W. Haefliger

[57] ABSTRACT

Tub apparatus including:
(a) a foamed plastic tub wall having an inner side and an outer side, the tub having an interior to receive liquid,
(b) a tensile liner adjacent the wall side, the liner comprising interwoven strips of pre-stretched plastic material characterized in that the liner resists outward expansion in response to loading exerted by liquid filled into the tub interior.

11 Claims, 3 Drawing Sheets

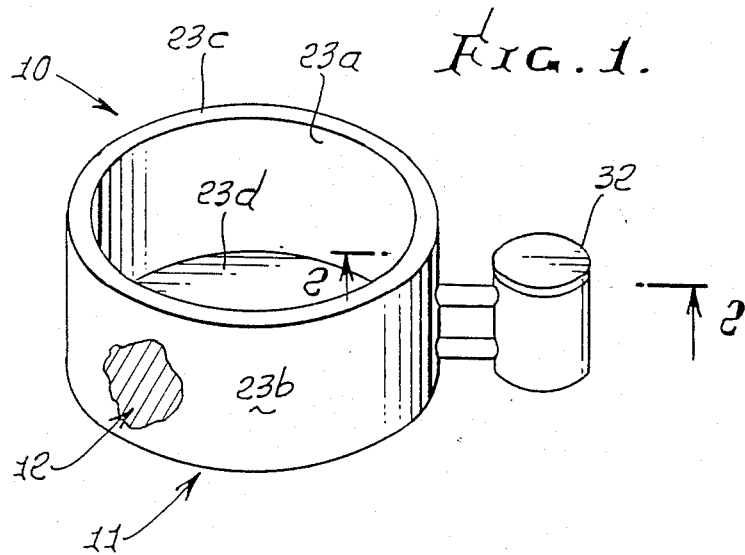
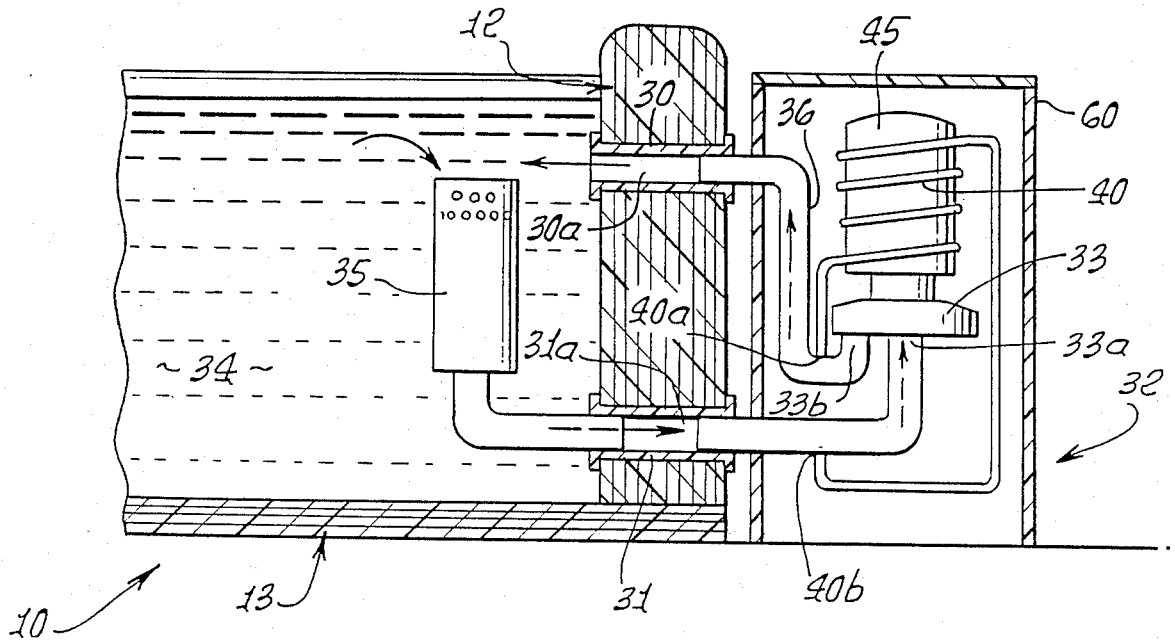
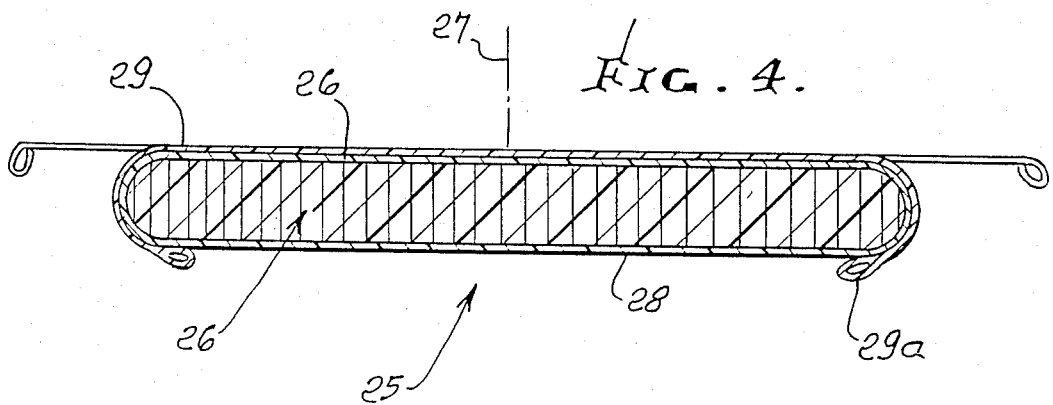

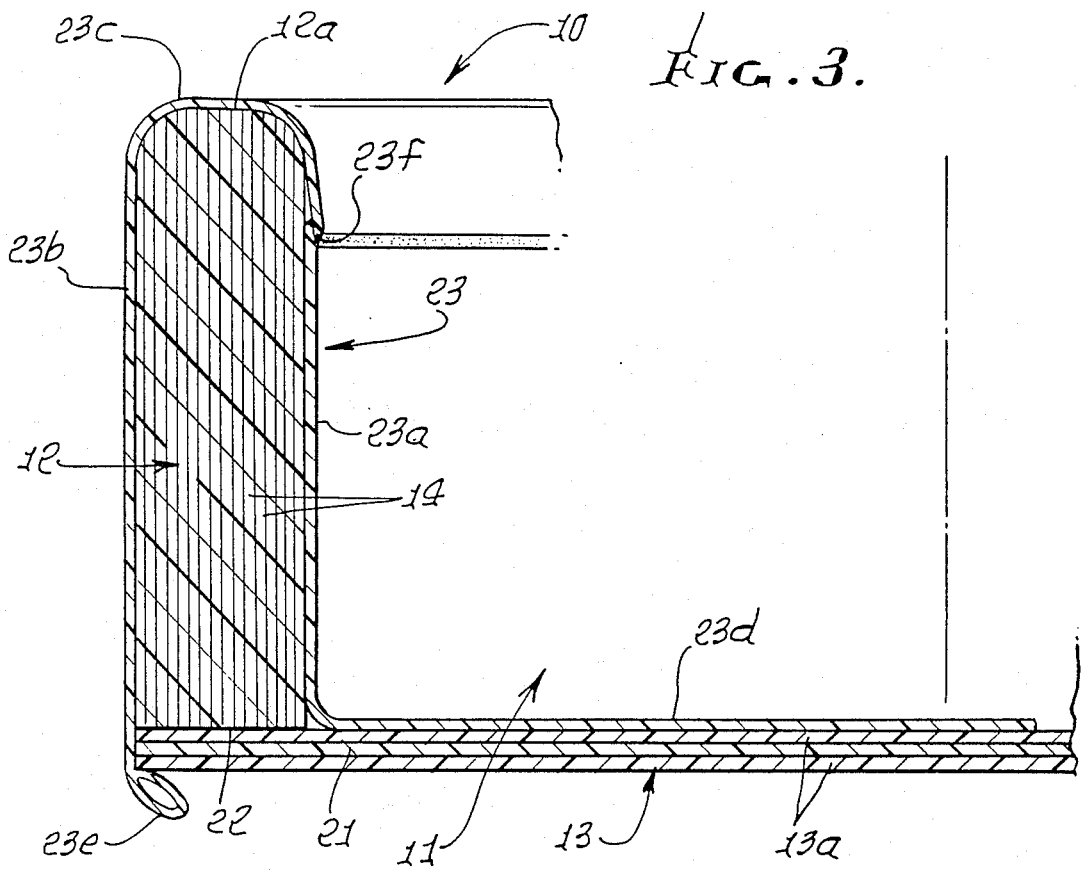
FIG. 3.
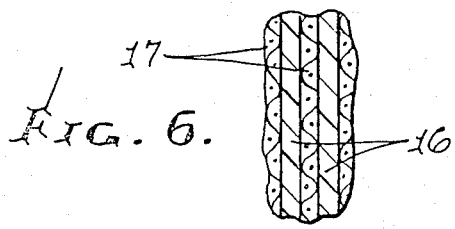
FIG. 6.
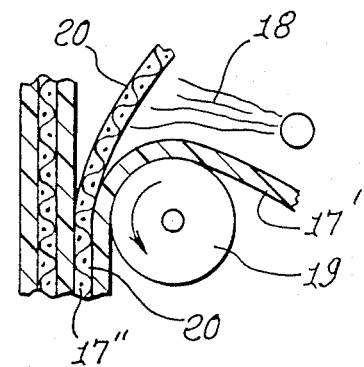
FIG. 6a.
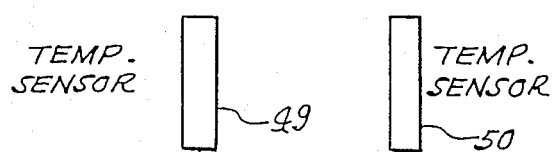
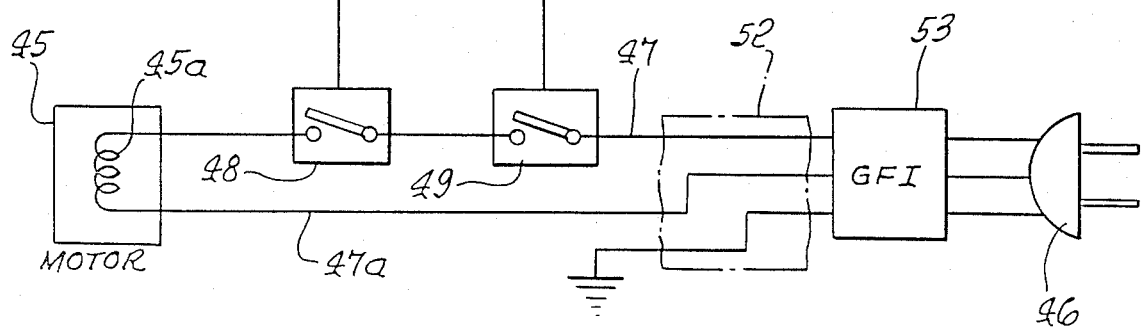
FIG. 5.

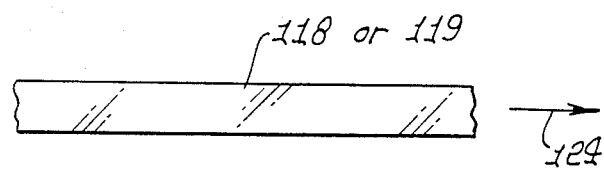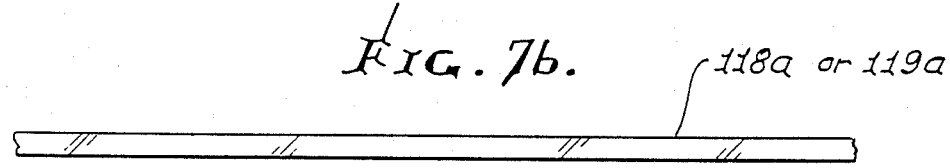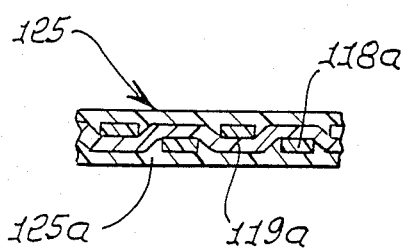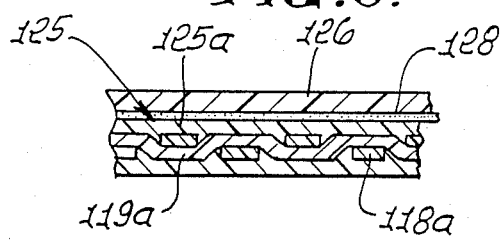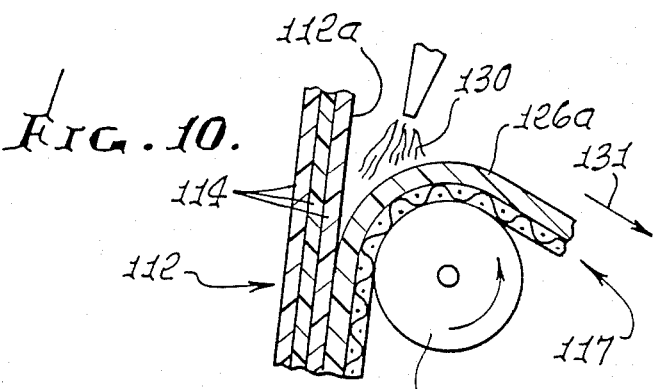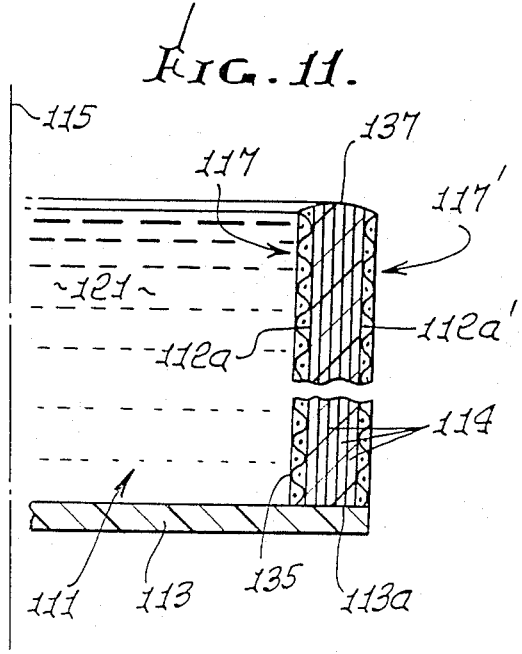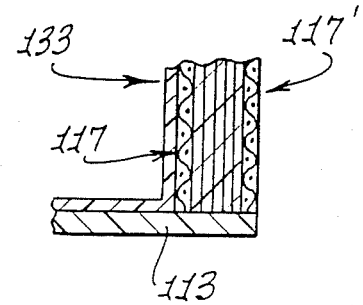

TUB APPARATUS

BACKGROUND OF THE INVENTION

This application is a continuation-in-part of Ser. No. 891,232, filed July 30, 1986.

This invention relates generally to hot tubs or spas, and more particularly to a low-cost, light-weight, insulated, semi-rigid plastic spa, which is esily portable, and hot water supply means therefor.

Conventional hot tubs are heavy, non-portable, and expensive in their construction; also, excessive electrical and heat energy is required for their operation. There is need for a greatly improved spa structure with the unusual advantages in construction, modes of operation, use and transport, and results, as are now made possible by the present invention, as will appear.

SUMMARY OF THE INVENTION

It is a major object of the invention to provide a hot tub or spa meeting the above needs. Basically, the inexpensive, light-weight tub apparatus comprises:

(a) a foamed plastic wall having an inner side and an outer side, the tub having an interior to receive liquid, (b) a tensile liner adjacent the wall side, the liner comprising interwoven strips of pre-stretched plastic material characterized in that the liner resists outward expansion in response to loading exerted by liquid filled into the tub interior.

It is a further object to provide a non-stretchable flexible liner that includes a plastic foam layer bonded to the interwoven strips and also to the wall inner side. As will be seen the plastic strips may consist of pre-stretched polyethylene, and the mesh formed by the interwoven strips is typically embedded with a plastic coating to prevent leakage of liquid through the liner.

If the liner is applied to the inner side of the tub wall, a similar liner may also be applied to the outer surface of the wall defined by the spiral wound layers, to resist wall expansion, and a plastic jacket may be applied over the composite wall, as thus formed.

The method of constructing the tub apparatus basically includes:

(a) winding said sheet in a spiral to form spiral convolutions and progressively bonding together the spiral convolutions during said winding, thereby to form an upstanding tub wall having an inner side and an outer side, and a tub interior, (b) and bonding said liner to said wall inner side to resist outward expansion toward said wall in response to loading exerted by liquid filled into the tub interior.

Bonding is typically affected by heating the side of the liner to tacky state, and pressing the heated side of the liner against the side of the tub wall; the liner also typically includes a plastic foam layer bonded to said interwoven strips, and said heating heats a surface of the plastic foam layer to tacky state; and a roller is typically employed to progressively press the liner toward said wall, and the liner is fed about the roller to present said surface of foam layer away from the roller, for heating.

These and other objects and advantages of the invention, as well as the details of an illustrative embodiment, will be more fully understood from the following specification and drawings, in which:

DRAWING DESCRIPTION

FIG. 1 is a perspective view of spa equipment embodying the invention:

FIG. 2 is an enlarged section on lines 2—2 of FIG. 1;

FIG. 3 is an enlarged section showing construction of the spa side wall and bottom wall;

FIG. 4 is an enlarged section showing interior construction of the spa unit cover;

FIG. 5 is a wiring diagram;

FIGS. 6 and 6a are enlarged views showing tub wall structure;

FIGS. 7a and 7b show plastic strips;

FIG. 8 shows a mesh formed by interwoven strips, and coated with plastic;

FIG. 9 shows a completed liner;

FIG. 10 shows bonding of a liner to the tub wall;

FIG. 11 shows a completed tub with lining or linings applied; and

FIG. 11a is a fragmentary view showing a jacket applied.

DETAILED DESCRIPTION

Referring first to FIG. 3, the apparatus 10 includes a tub 11 having an insulative, annular side wall 12, and a bottom wall 13 attached to side wall. The side wall comprises a foamed plastic sheet or sheets 14 wound in a spiral about the tub axis 15, to form multiple layers. The latter are better indicated at 16 in FIG. 6, with glass fiber reinforcement screen material 17 between the foamed plastic layers 16. Such layers may typically consist of polyethylene foam of between ⅛ and ⅜ inch thickness, as for example, about ¼ inch thickness; and the glass fiber screen may define about ½ inch square open spaces between woof strands, and between warp strands. The polyethylene layers are rapidly joined together as by engagement of the outermost layer, during spiral winding, with a heating flame 18 and a roller 19, as seen in FIG. 6a. The pressure roller presses the heated inner surface of the outermost layer 17' against the flame heated outer surface of the next inner layer 17" to establish fusion contact, as for example through the spaces between warp strands 20, and also between woof strands extending at 90° to strands 20. Thus, an integral relatively stiff and very sturdy spiral fusion laminated light-weight side wall 12 is gradually formed during the spiral winding process; and a person may sit comfortably on the top edge or rim 12a of the wall 12 without damaging it or the tub construction.

The tub bottom wall 13 has a similar construction except that parallel sheets 13a (⅜ inch thick) of cross linked polyethylene foam, with or without glass fiber layers 12 therebetween, are heat fusion welded to form an integral bottom wall. The latter is then peripherally fusion welded as at 22 to the bottom of the side wall. A plastic jacket 23 may be fitted about both the side wall and bottom wall. Jacket 23 sheets may consist of foamed, reinforced, marine vinyl resin; and include inner sheet 23a, outer sheet, 23b, crest sheet 23c, and bottom sheet 23d, all joined together to form an internal waterproof decorative jacket, as shown. Jacket lower edge extent may be looped as at 23e, and a draw string fitted in the loop to be drawn tight and attach the jacket to the wall 12. A welded seam is indicated at 23f. The vinyl jacket may have selected weatherable color.

A pool cover is shown at 25 in FIG. 4, with generally the same spiral polyethylene layer construction, as does wall 12. Thus, spiral polyethylene layer or layers 26 extending about vertical axis 27 can be fusion welded together, similar to the wall section but typically without the fibers. Additional structure and stiffness is imparted to the cover by creating thermally densified layers on each face, 26 and 28. These are created by compressing the spiral wound structure between two hot plattens. A vinyl jacket 29 is fitted about the polyethylene windings, and is held in place by a draw string in loop 29a.

FIG. 2 shows upper and lower ports formed through the tub wall as by tubular plastic fittings 30 and 31. Water circulating means 32 is connected with those ports, and includes a pump 33, for circulating water into the tub interior 34 via upper port 30a, and for withdrawing water from the tub interior 34 as via lower port 31a. A filter 35 is located within the tub to filter the water being withdrawn through port 31a, so that dirt and small objects are not fed to the pump lower inlet 33a. The filter is easily withdrawn upwardly at the tub interior, for cleaning or replacement. The pump discharges sidewardly at outlet 33b, and plastic piping extends upwardly at 36 to deliver pressurized and heated water to port 30a.

In accordance with an important aspect of the invention, the water circulating means includes an electric motor connected in driving relation with said pump, and includes a shunt duct connected with the water circulating means and located to receive heat generated by operation of the motor to heat a side stream of the water passing through the shunt duct. The illustrated shunt duct includes metallic tube 40 wound about the pump drive motor 45 to receive heat from same, for heating the tub water, whereby extreme simplicity and energy savings are realized. The duct 40 has an end connected at 40a into the water circulating system proximate pump outlet i.e. into piping upper branch 36; its opposite end connected as at 40b into the water circulation system proximate pump inlet 33a, i.e. in lower piping branch 43 extending from port 31a to inlet 33a. Accordingly, water flows in the shunt duct from a higher (pressurized) level to a lower level; and a portion of the water flowing through the pump is heated and re-heated, for highly efficient heating action. Thus, no external source of heat for the hot-tub water is required, and motor 45 serves multiple functions, its waste heat being efficiently utilized. The height of the inlet and outlet of the shunt duct are approximately the same to minimize thermosyphon action when the motor is off. The thermosyphon action can cause a momentary surge of extra hot water to trip the high limit switch 49.

In the schematic of FIG. 5, the motor coil 45a is supplied with electrical energy from a plug 46, such as is insertible into a household 120 volt outlet receptacle. The wiring interconnecting the plug and coil includes line 47 with which thermostat switch 48, and high limit switch 49 are connected in series. Switch 48 is operated by a thermostat sensor 49 applied to inlet port 30a, whereby if the water is too hot, the motor is shut down. Limit switch 49 is also controlled by temperature sensor 50 located adjacent the tub to shut the motor down if the tub becomes overheated. Line 47 and return line 47a pass through cord 52, and through a ground fault interruptor 53, as shown.

A plastic shell enclosure or housing for the pump and motor is indicated at 60. It is well insulated to keep the heat generated by the motor inside where it can be transmitted to the water, and to minimize sound from the motor and pump inside for the comfort of the users. It is a compact package which facilitates ease of transport and set-up of same.

In FIG. 11 the tub apparatus 111 includes an insulative, bottom wall 113 supporting the side wall, as by attachment to the lowermost extent thereof, at 113a. The side wall comprises a foamed plastic sheet or sheets 114 wound in a spiral about tub axis 115, to form multiple layers. Such layers may typically consist of polyethylene foam of between ⅛ and ⅜ inch thickness, as for example about ¼ inch thickness. The layers are rapidly joined together as by engagement of the outermost layer, during spiral winding, with a heating flame, as described above in connection with FIG. 6a; however, no glass fiber screen is employed.

Instead, an inner liner 117 is provided adjacent the wall inner side 112a. As indicated in FIG. 9, that liner comprises interwoven strips 118a and 119a of prestretchable plastic material characterized in that the liner resists outward expansion toward wall 112 in response to loading exerted by liquid such as water 121 in the tub interior. See FIG. 11. Therefore, the tub wall 112 is not deflected or stretched radially outward, as it would be in the absence of the liner.

FIG. 7a shows a typical thermoplastic (such as polyethylen) strip 118 or 119 prior to pre-stretching, endwise, in the direction of arrows 123 and 124. FIG. 7b shows the same strip 118a or 119a after such stretching, with a correspondingly reduced width, to provide high tensile strength. FIG. 8 shows the strips 118a and 119a closely interwoven with warp 118a and woof 119a strand or strip layer or mesh pattern 125. The woven strips are then embedded in or coated with a plastic coating 125a to prevent leakage of liquid therethrough and to provide load spreading. The plastic coating may also consist of polyethylene. Such a mesh is a product of Chave and Early, New York, N.Y., and sold under the name "CE-TEX".

FIG. 9 shows the completed liner 117, which includes a plastic foam layer 126 bonded in face-to-face relation with one side of the coating layer 125a. The layer 126 may for example consist of polyethylene foam. The bond interface is indicated at 128, and may be formed by heat fusion.

As a result, the composite liner 117 may be fusion bonded to the inner side 112a of the spiral layer wall 112. FIG. 10 shows that process. Bonding is carried out by heating the outer side 126a of the layer and/or the side 112a, to tacky state, and then pressing the hot tacky side 126a against the side 112a of spiral layer wall 112. Liner 117 extends more than 360° around the tub, to provide overlap. Heating is effected by directing flame 130 or other heat source heat against sides 126a and/or side 112a, as seen in FIG. 10, and as the liner is progressively fed in direction 131, a pressure roller 132 rolling against the applied liner to press side 126a against side 112a.

FIG. 11 also shows a like liner 117' applied against the outer side 112a' of the wall 112, to also resist outward stretching of the wall 112 and also to add toughness. Finally, a jacket 133 like jacket 123 may be applied or attached to the inner surface 135 of the completed tub wall and to tub bottom wall 113, or to the liner 117. See FIG. 11a, the jacket applied in the same manner as in FIG. 3. A tub wall upper rim appears at 137, in FIG. 11. Jackets 123 and 133 may have the same construction as tensile liner 117.

In the above FIGS. 10, 11 and 11a, the lined tub wall indicated by layers 114 may instead be a single layer of foam.

From the foregoing it will be understood that the primary purpose of the tensile band or liner 117 is to absorb the hoop stress caused by the pressure resulting from the column of water in the tub. Without such tensile band, the water pressure places continuous compression and tensile stresses on the inner side of the tub wall. The polyethylene foam walls or layers 114 expand, especially at the bottom, in the absence of tensile band 117. That band also provides improved wall toughness and reduced communication of fluids between tub walls and outside environment.

A like tensile band in the wall between the inner and outer sides of the wall may be employed to absorb hoop stress while allowing some compression and compliance of foam inside tensile band. One such layer as seen in FIG. 11 may be considered to represent such an intermediate band.

An O.D. tensile band as at 117, is usable to absorb loads from people sitting on the tub wall, improve O.D. toughness, improve aesthetics, and reduce communication of fluids between tub walls and environment.

Liner materials or composites may be constructed to have enough tensile strength to act as tensile band. Typical materials include vinyl film or films laminated to polyester fabrics and polyester fabrics coated with vinyls. Unattached and/or attached tensile band materials include metal foil, glass fibre reinforced polymers, aluminum sheet, coated and uncoated polyester fabrics, films laminated to polyester fabrics, spun bonded polyester fibres, tensilized polyester films, and tensilized polyethylene films slit to thin strips and woven in two axes and coated with polyethylene as described herein. Thin layers of PE/EVA, PE, EVA, XLPE and/or PVC foam may be attached to the inside of the tensile band to reduce water transport, improve aesthetics and/or feel, from inside the tub, to act as a tie layer, and to act as a compression element for plumbing seals.

Fibre or filament molecular orientation is preferably generally circumferential, however, biaxial and random orientation are also possible.

Tensile band or bands may be attached to a liner for a tub wall inner surface, as via adhesive, solvents, and/or thermal fusion techniques including radio frequency heat sealing and ultrasonic welding. Tie layers may be used to make material attachment easier, via improved bonding compatability, to add stiffness, to reduce leakage, and/or improve aesthetics and feel.

Intermediate tensile bands (between I.D. and O.D.) may use the above described materials, or glass fibres and polymer fibres in loose, unidirectional and bidirectional fabrics, fused between layers of polyethylene foam during wall construction. Outer side tensile bands may be fastened using above methods, or by shrinking on the tub outer wall.

Tensile band material candidates are typically available as rolls and must be overlapped to create a circumferential tensile band. Although tensile bands spirally wound into the tub wall may be overlapped without direct connection, I.D. and O.D. tensile bands typically require joining as via solvents, adhesives, mechanical fasteners and/or thermal fusion techniques.

Tensile band acting as liner, or attached to a liner, may be provided to add stiffness to the liner and thereby ease fitting to the inside of the tub. Additionally, this configuration toughens the liner and may be used along with a foam layer as a mechanical plumbing seal.

We claim:

1. A spa tube comprising, (a) a multi-layered, upstanding insulative annular side wall having an inner and an outer surface, said side wall being formed from an outer-most sheet layer of foamed plastic sheet material followed by successive sheet layers of foamed plastic material, each successive foamed plastic sheet layer being applied to said outer sheet layer by winding in a spiral fashion about an axis passing through the center of the space enclosed by said side wall, successive foamed plastic sheet layers being fused together to form a unitary member,
   (b) a reinforcing tensile liner defined by pre-stretched interwoven strips of plastic material, said liner extending about said axis and bonded to said foamed plastic sheet layers forming said group and at the innermost side thereof,
   (c) a bottom wall made up of parallel sheets of foamed plastic fused together, the bottom wall being fused to the bottom of said side wall with said axis passing through said parallel sheets,
   (d) a water impermeable plastic jacket covering said inner surface of said reinforcing line and overlying said bottom wall,
   (e) and including ports extending through said side wall, liner and jacket, and water circulating means connected with said ports and including a pump for circulating water from and toward the interior of said tub.

2. The apparatus of claim 1 wherein the liner includes a plastic foam layer bonded to the interwoven strips and also to the tub wall inner side.

3. The apparatus of claim 1 where in said strips consist essentially of polyethylene.

4. The apparatus of claim 2 wherein the liner also comprises a plastic coating on and embedding the interwoven strips.

5. The apparatus of claim 4 wherein said plastic foam layer is bonded to said coating.

6. The apparatus of claim 1 wherein the tensile liner is at the inner side of the wall, and including an outer tensile liner adjacent said wall outer side, the outer liner comprising interwoven strips of pre-stretched plastic material characterized in that the liner resists expansion in response to loading exerted by liquid filled into the tub interior.

7. The apparatus of claim 6 wherein the outer liner includes a plastic foam layer bonded to the interwoven strips and also to the wall inner side.

8. The apparatus of claim 6 wherein said strips of the outer liner consist essentially of polyethylene.

9. The apparatus of claim 7 wherein the outer liner also comprises a plastic coating on and embedding the interwoven strips.

10. The apparatus of claim 1 where said means include an electric motor connected in driving relation with said pump, the pump having a water intake and a pressurized water discharge, and including a shunt duct connected with said water circulating means and located to receive heat generated by operation of said motor to heat a side stream of said water passing through said shunt duct, the motor having a casing and the shunt duct including metallic tubing wrapped about the motor casing to receive heat therefrom, the shunt duct having inlet and outlet ends, the inlet end located proximate said pump intake and the duct outlet end located proximate said pump discharge and at a lower level than said inlet end.

11. The combination of claim 1 including a cover extending over the interior of the tub, said cover including a foamed plastic sheet or sheets and forming multiple insulative layers which are fused together.

* * * * *